Dec. 2, 1924.  
C H. THOMPSON  
POULTRY FOUNTAIN  
Filed Jan. 19, 1924

1,518,018

C. H. Thompson, Inventor

By *[signature]*

Attorney

Patented Dec. 2, 1924.

1,518,018

UNITED STATES PATENT OFFICE.

C. HARLAN THOMPSON, OF SAN ANTONIO, TEXAS.

POULTRY FOUNTAIN.

Application filed January 19, 1924. Serial No. 687,259.

*To all whom it may concern:*

Be it known that I, C. HARLAN THOMPSON, a citizen of the United States, residing at San Antonio, in the county of Bexar and State of Texas, have invented a new and useful Poultry Fountain, of which the following is a specification.

This invention relates to drinking fountains, for baby chicks.

The object of the invention is to provide a device of this character in which an ample supply of water may always be on hand without necessitating the continued filling of the container, and it effectively protects the chicks from wetting their breasts, and yet permits them to drink freely at all times.

Another object is to provide a device of this character which is simple in construction, cheap to manufacture, and which may be readily cleansed and which is protected against the entrance of dirt and the like, thereby insuring its sanitation.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Figure 1:
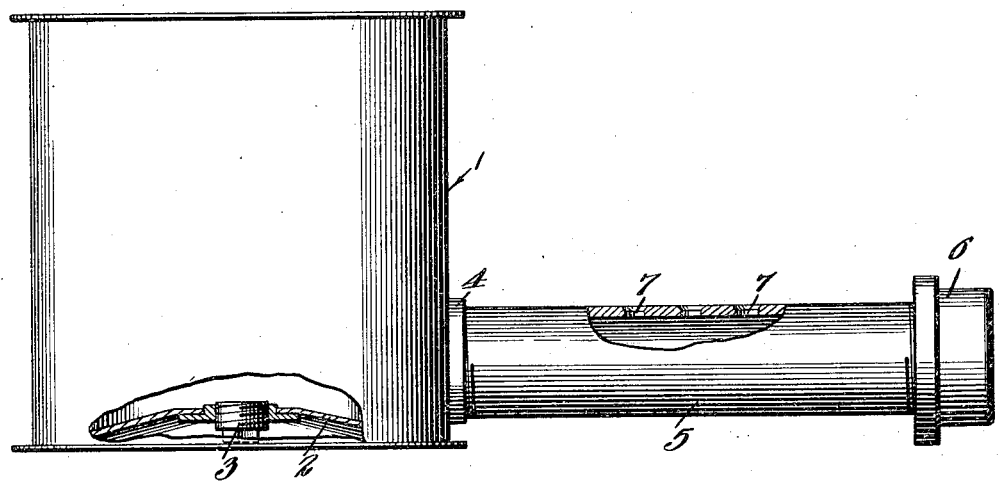
Figure 2:
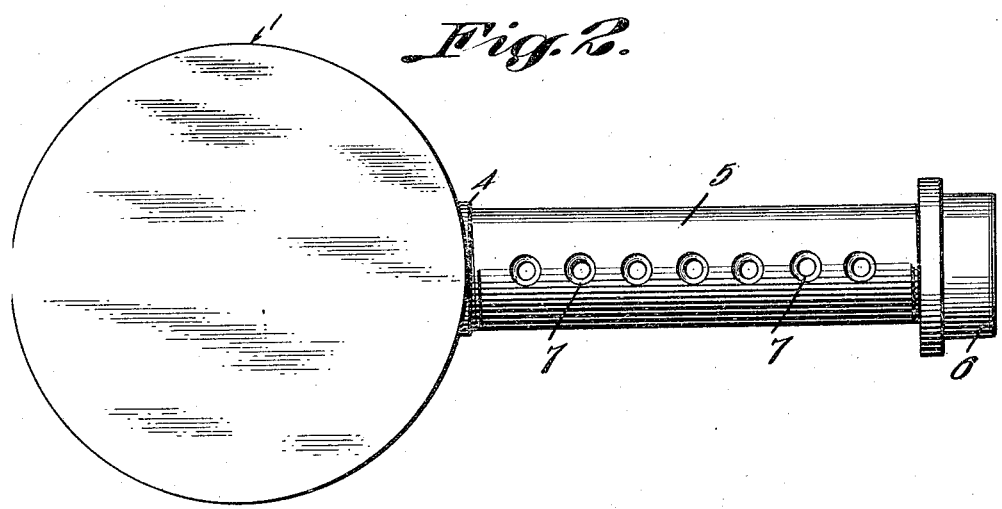

In the accompanying drawings:

Figure 1 represents a side elevation of a drinking fountain constructed in accordance with this invention with parts broken out and in section, and Fig. 2 is a top plan view thereof.

In the embodiment illustrated, a closed water container 1 is shown preferably constructed of galvanized metal having an inwardly convexed bottom with a filling plug 3.

This tank 1 is provided in one side wall in the bottom thereof with an opening having an internally threaded collar 4 arranged therearound in which is removably mounted a pipe 5 which extends laterally from the tank 1 and is equipped at its outer end with a removable cap closure 6. This pipe 5 is provided in its upper wall with a plurality of longitudinally spaced openings 7 flaring toward their outer ends to form countersunk mouths of a size sufficient for the insertion of the baby chick's bill so that it may drink without getting wet and while providing ample room for this purpose avoids the formation of projections, said mouths being continuously filled with water. This pipe 5 may be of any desired size, being preferably one and one-fourth inches in diameter.

The pipe 5 may be removed from the tank 1 by unscrewing it from the collar 4 and by removing the closing cap 6, the pipe may be thoroughly cleansed. The removable pipe also facilitates the cleansing of the tank, which may be accomplished by inserting a suitable cleansing implement through the collared opening 4.

Various changes in the form, shape, proportion and other minor details of construction may be made without departing from the principle or sacrificing any of the advantages of the claimed invention.

I claim:—

A drinking fount for baby chicks comprising a closed cylindrical container adapted to sit on one end in upright position, said end being bulged inwardly and having a filling plug therein whereby said plug is housed and protected; a pipe extending laterally at right angles from the lower portion of said container and provided in its upper wall with a plurality of longitudinally spaced countersunk openings, said pipe being removably connected with the container at one end and having a removable cap like closure at its other end.

In testimony that I claim the foregoing as my own, I have hereto affixed my signature in the presence of two witnesses.

C. HARLAN THOMPSON.

Witnesses:
 BRYAN WHITE,
 J. L. STAFFORD.